UNITED STATES PATENT OFFICE.

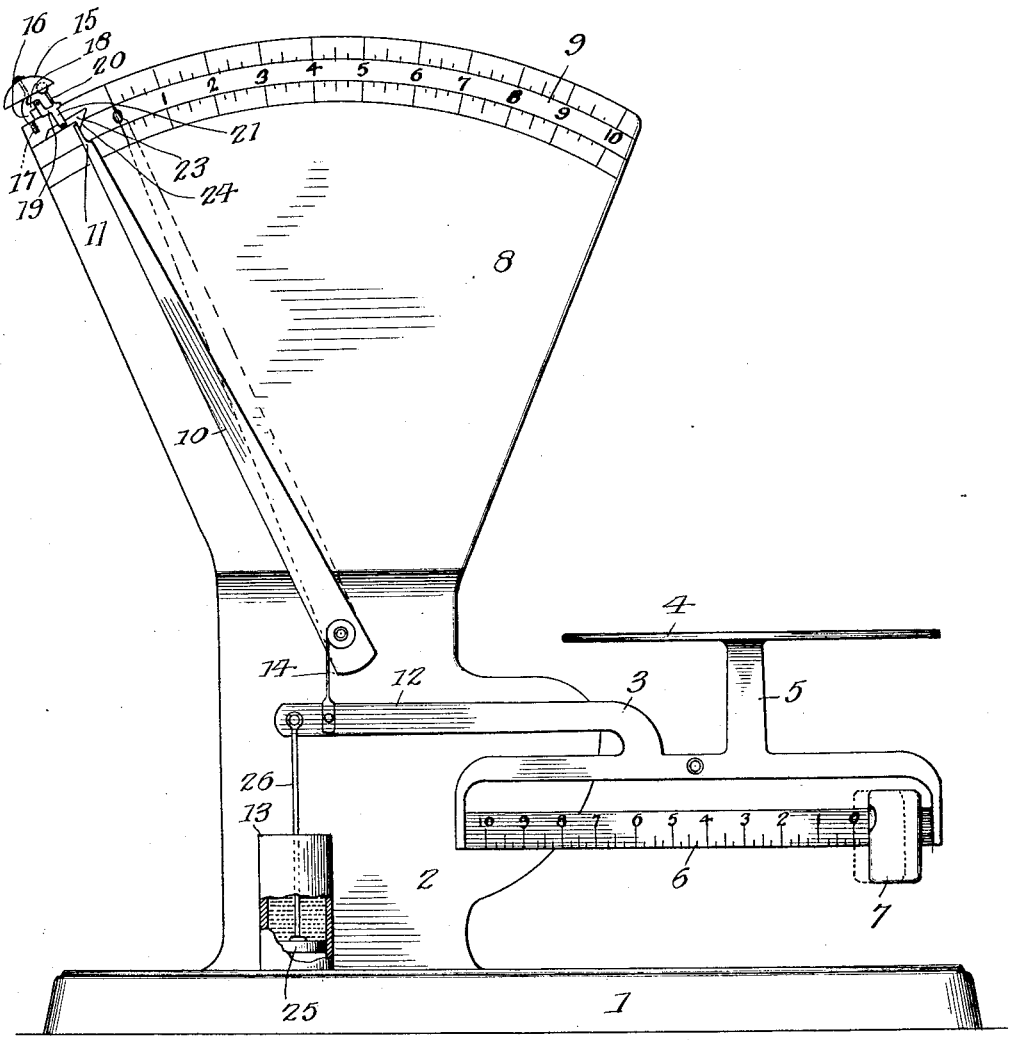

WILLIAM JASPER RICE, OF CORPUS CHRISTI, TEXAS.

SCALE-ALARM.

1,058,467. Specification of Letters Patent. Patented Apr. 8, 1913.

Application filed May 26, 1911. Serial No. 629,580.

*To all whom it may concern:*

Be it known that I, WILLIAM J. RICE, a citizen of the United States, and a resident of Corpus Christi, in the county of Neuces, State of Texas, have invented a new and useful Improvement in Scale-Alarms, of which the following is a specification.

My invention is an improvement in scale alarms, and has for its object the provision of a simple, inexpensive, easily applied, and automatic device operated by the placing of the article to be weighed on the scales for indicating to the operator that the scales do not balance, or that it is out of poise.

A further object is to provide an improved regulating means for the indicator which will not be affected by temperature changes.

In the drawings is shown a front view of scales provided with the improvement, parts thereof being in section.

The present embodiment of the invention is shown on scales consisting of a frame composed of a base 1, and a standard 2 connected with the base at one end and rising above the same. A beam 3 is mounted for swinging movement on the frame, and a pan 4 is connected with the beam by means of a vertical arm 5. The beam is provided with the usual graduated bar 6, upon which is slidably mounted a weight or pea 7, and the upper end of the standard is widened into an approximate fan shape, as shown at 8, and is provided with the usual computing scale 9.

An indicator 10 is mounted to swing on the standard, and the point 11 thereof coöperates with the scale 9 to indicate the price of the article on the pan. The beam 3 is provided with an arm 12 extending in the opposite direction from the pan and between the indicator and a cylinder 13 on the base. A link 14 connects the arm 12 of the beam with the indicating arm in the usual manner, so that when the beam is moved by the article on the pan the arm 10 will be swung longitudinally of the scale 9 in register with the proper numeral or numerals to designate the price of the article.

The operating mechanism of the scale forms no part of the invention, since it is applicable to any form of scale, whether computing or non-computing, and the type of scale shown is taken merely for convenience. Hence it is not thought necessary to further describe the said mechanism.

A signal is supported on the extension 8 of the standard near the commencement of the scale 9, and the signal is preferably an audible signal, a bell 15 in the present instance. The bell is supported on an upright 16, having a stem 17 threaded into an opening in the top of the extension and provided with a lateral arm 18. An elbow lever 19 is pivoted at the free end of one arm on the arm 18, and a hammer 20 extends upwardly from the free end of the other arm into position for striking and ringing the bell when the lever is swung in one direction. The arm of the elbow lever provided with the bell is also provided with a depending arm 21, to which is pivoted a catch in the form of a lever 22. The lever is pivoted intermediate its ends, and the end adjacent to the indicating arm is provided with a lateral tooth 23 for engagement by the upper end or point 11 of the said arm. The tooth is provided at the side adjacent to the scale 9 with an inclined surface 24 for engagement by the point 11 to lift the lever 21 so that the point may engage behind the tooth, as shown in full lines in the drawing. The tooth 23 is in position for engagement by the arm 10 when the said arm is in inactive position, that is, when the said arm is at the commencement of the scale 9. When the indicating arm moves toward the right end of the scale the said arm will swing the elbow lever and cause the hammer to strike the bell.

In weighing commodities in bulk a vessel is necessary for holding the goods on the pan, and, whether such receptacle is the usual scoop or another vessel, the weight thereof is balanced by the pea on the tare beam 6. That is, the vessel is placed on the pan 4 and the pea 7 is moved to the left of the beam 6 until the pan and vessel are balanced, which is shown by the movement of the arm 10 to 0 on the scale 9. The goods are then placed in the vessel and the arm 10 swings to the right of the scale 9, indicating on the said scale the price of the said goods. The pea 7 should then be returned to inoperative position, otherwise, when the next lot is weighed, the seller loses the weight of the vessel computed into money at the selling price of the said next lot of goods.

With the improvement, however, should the seller neglect to return the pea when he again uses the scale, the elbow lever will be swung by the movement of the indicating arm into computing position, thus notifying him that the scale has not been balanced. The action of the scale is regulated by means of the cylinder 13 before mentioned. A piston 25 moves in the said cylinder, and a rod 26 is connected at one end to the piston and at the other end to the outer end of the arm 12.

In the ordinary scale the cylinder 12 is filled or partially filled with glycerin, in which the piston moves. A by-pass is provided for the glycerin, and a valve is arranged in the by-pass to regulate the quantity of glycerin passing therethrough. The glycerin is very sensitive to temperature changes, becoming thicker when cold and thinner when warm. Constant attention to the valve is thus necessary, in order that the scale may properly perform its function. To relieve the operator from this care, the piston 25 is of such size that it fits the cylinder closely, and kerosene is substituted for the glycerin. The relative dimensions of piston and cylinder are such that the piston moves easily, but with sufficient clearance to permit the kerosene to pass by the piston as it moves up and down in the cylinder. The piston is also made of greater depth or thickness. When so constructed, no by-pass is necessary, and no valve for controlling the same. Neither is the kerosene affected by changes in temperature, working equally well in cold and hot weather.

I claim:

1. In a computing scale, the combination with the indicating scale and the arm mounted to swing longitudinally of the scale, of a bell at the commencement of the scale, a lever pivoted adjacent to the bell and provided with a depending arm, a hammer on the lever for striking the bell when the lever is swung in one direction, and a catch on the arm for engaging over the indicator arm when in inactive position.

2. In a computing scale, the combination with the indicating scale and the arm mounted to swing longitudinally of the scale, of a signal mounted adjacent to the commencement of the scale, a lever provided with means for operating the signal, and a catch on the lever in position to engage the swinging arm when in inactive position.

3. In a computing scale, the combination with the indicating scale and the arm mounted to swing longitudinally of the scale, of a signal mounted adjacent to the said arm, means for operating the signal, and a catch on the said means in position to engage the arm when the said arm swings into inactive position.

WILLIAM JASPER RICE.

Witnesses:
H. R. SUTHERLAND,
GERTRUDE EGAN.

---

Copies of this patent may be obtained for five cents each, by addressing the "Commissioner of Patents, Washington, D. C."

---